United States Patent [19]

Rohloff

[11] Patent Number: 4,704,099

[45] Date of Patent: Nov. 3, 1987

[54] ROLLER CHAIN FOR CHAIN DRIVES

[76] Inventor: Bernhard Rohloff, Grillparzerstrasse 29, D-3500 Kassel, Fed. Rep. of Germany

[21] Appl. No.: 848,999

[22] Filed: Apr. 7, 1986

[30] Foreign Application Priority Data

Aug. 9, 1984 [DE] Fed. Rep. of Germany ....... 3429383
Sep. 20, 1984 [DE] Fed. Rep. of Germany ....... 3434516
Feb. 19, 1986 [DE] Fed. Rep. of Germany ....... 3605341

[51] Int. Cl.⁴ .............................................. F16G 13/06
[52] U.S. Cl. .................................... 474/231; 474/216
[58] Field of Search ............... 474/214, 215, 216, 217, 474/228, 229, 231

[56] References Cited

U.S. PATENT DOCUMENTS

| | | | |
|---|---|---|---|
| 1,496,021 | 6/1924 | Ramsey | 474/217 |
| 1,863,606 | 6/1932 | Perry | 474/230 X |
| 2,117,169 | 5/1938 | Howe | 474/231 |
| 2,231,379 | 2/1941 | Belcher | 474/91 |
| 2,568,649 | 9/1951 | McIntosh et al. | 474/231 |
| 2,655,816 | 10/1953 | Riopelle | 474/217 |
| 2,669,879 | 2/1954 | Pierce | 474/217 |
| 3,153,348 | 10/1964 | Kuntzmann | 474/231 |
| 3,302,388 | 2/1967 | Gentsch | 474/231 X |
| 3,955,434 | 5/1976 | Henning | 474/228 |

FOREIGN PATENT DOCUMENTS

810450 8/1951 Fed. Rep. of Germany ...... 474/217
426302 4/1935 United Kingdom ............... 474/231

Primary Examiner—George A. Suchfield

[57] ABSTRACT

The invention relates to a roller chain for chain drives, which has a plurality of inner and outer links alternating in tandem. The inner links have at least two inner plates having pairs of pin holes and having pin bearings disposed between the pin holes. The outer links contain each at least two outer plates which are joined together by at least two pins fastened in them. For the articulation of the outer links with two adjacent inner links each, the one pin of each outer link reaches through one of the pairs of pinholes and the associated pin bearing of one of the adjacent inner links, and the other pin of each outer link reaches through one of the pairs of pin holes and the associated pin bearing of the other of the adjacent inner links. The pin bearings are encompassed by rollers disposed for loose rotation between the inner plates. According to the invention the pin bearings consist of bearing shells affixed to the inner plates and only partially encompassing the pins, which, when the chain is in the outstretched state, are situated opposite clips disposed within the rollers and between the inner plates, and which also encompass the pins only partially, which together with the bearing shells encompass the pins on circumferential sections totaling less than 360°, so that they are movable circumferentially relative to the bearing shells.

13 Claims, 16 Drawing Figures

ROLLER CHAIN FOR CHAIN DRIVES

The present application is a continuation-in-part of the International Application designating the United States of America filed on Aug. 5, 1981 under No. PCT/EP85/00399.

BACKGROUND OF THE INVENTION

The invention relates to a roller chain for chain drives, having a plurality of inner links and outer links, the inner links having at least two inner plates provided with two pairs of coaxially aligned pin holes and with pin bearings disposed between the holes, the outer links containing at least two outer plates each which are joined together by at least two pins fastened to them, the one pin of each outer link passing through one of the pairs of pin holes and the associated pin bearing of one of the adjacent inner links, and the other pin of each outer link passing through one of the pairs of pin holes and the associated pin bearing of the other of the adjacent inside links, for the purpose of the pivotal joining of the outer links to each two adjacent inner links, and the pin bearings being surrounded by rollers disposed in a loosely rotatable manner between the inner links. Such roller chains are suitable especially for the chain drives of motorcycles or bicycles with or without derailleurs.

Roller chain drives are among the power transmission systems of high efficiency, light weight and sturdy construction which are able to transmit great forces over great distance between shafts. The chain is the power transmission means. In sprocket-changing drives (hereinafter called "derailleurs") the chain is at the same time the shifting means. Generally, roller chains are used which have different kinds of plates. The links are so constructed that the pins of the outer links rotate in sleeves of the inner links, the sleeves being fastened nonrotatably on the inner plates and additional rollers being mounted rotatably on the sleeves.

In the roller chains used heretofore, the following problems are known:

The link wear which develops due to the pivotal movement of the chain links under load as they engage and disengage the sprocket causes an increase in the effective pitch. The length of the chain increases accordingly. This elongation due to wear is nonuniform in conventional sleeve and roller chains. Due to the resulting nonuniform meshing of the chain, a uniform engagement of chain and sprockets is no longer possible. The result is increased wear on the flanks of the sprocket teeth.

In conventional roller chains, the magnitude of the effective bearing surface necessary for the transmission of the chain forces is dependent upon the bearing clearance between pin and sleeve. This bearing clearance must be relatively great. This results in unfavorable link stress conditions.

In conventional chains, in order to assure easy running, not only the links but also the rollers must be well lubricated. In the case of free-running chain drives, e.g., on bicycles, this results in the accumulation of dirt on the sprockets and on the chain itself, and calls for increased maintenance on account of the additional wear caused by the dirt adhering to the lubricant.

Furthermore, conventional roller chains entail numerous problems if they are to be used in derailleurs.

It is therefore the object of the invention to create a roller chain in which the above-described problems and disadvantages will be eliminated. A further object of the invention is to replace the sleeves which are provided in conventional roller chains, and are affixed to the inner plates, with other components mainly for the purpose of reducing wear on the chains. At the same time these components are to be so designed that they will be easy and inexpensive to manufacture and assemble and will not impair the common function of a roller chain. Lastly the individual chain links are to be able to be deflected relative to one another by the greatest possible angle, as in conventional chains, this being desirable for packing purposes, and also for chain drives using extremely small sprockets.

THE INVENTION

For the achievement of this object, the invention is characterized by the fact that the pin bearings consist of bearing shells which are joined fixedly to the inner plates and only partially encompass the pins, which, with the roller chain in the outstretched position, are disposed each on the sides of the pin which face the adjacent outer links, and are situated opposite clips which are disposed within the rollers and between the inner plates and only partially encompass the pins, these clips, together with the bearing shells, extending around a portion of the circumference of the pins totaling less than 360°, so that the clips are movable circumferentially relative to the bearing shells.

The link construction according to the invention permits the manufacture of maintenance-free, trouble-free, strong and easy-running roller chains whose pitch remains the same when they become elongated due to wear, and whose links permit greater lateral deflection and are reliable in operation, and run dry on the sprockets without roller lubrication. The link construction according to the invention lengthens the useful life of a chain drive considerably, reduces maintenance, and improves the operation of derailleur drives. The roller chain according to the invention can further be manufactured and assembled with simple and inexpensive means.

The clips can be fastened either to the pins or to the outer plates of the outer links. In order to avoid any limitation of the angle of deflection of the individual chain links on this account, which is not always desirable, provision is made in a preferred embodiment of the invention to attach the clip not fixedly to the pin or outer plates, but to hold it on the pin by friction or by form-fitting, for example by means of additional friction rings, or to mount it so as to be freely movable on the pin. In this way the special advantage is achieved that the clip can turn with the pin in the normal use of the roller chain, but in extreme situations, after abutting against an edge of the pin bearing, it can overcome the friction and slide on the pin.

The invention will be further explained below with the aid of embodiments in conjunction with the appended drawing.

DESCRIPTION OF PREFERRED EMBODIMENTS

As seen in FIGS. 1 to 4, a roller chain according to the invention contains inner and outer links disposed alternately in tandem. Each outer link is composed of at least two parallel, flat outer plates 7 lying side by side, which are held together in a spaced-apart relationship by at least two cylindrical pins 1 with bearing surfaces 1a (FIG. 3) affixed to the outer plates by the fact that the pins 1 extend, for example, through pin holes 9 in the outer plates 7 and are riveted therein. Each inner link contains at least two parallel, flat inner plates 3 lying side by side, each having two pin holes 8 through which a pin 1 is passed such that each pair of inner plates 3 is disposed between two outer plates 7 and journaled on one of the pins 1. With the inner plates 3 in line with one another, each inner link 3 thus has two pairs of coaxially aligned pin holes 8 accommodating each one pin 1. In normal roller chains the inner plates 3 are spaced apart by means of sleeves around the pins 1, at a distance that is less than the space between the two outer plates 7. According to the invention, these sleeves are replaced each by two confronting segments disposed between the inner plates 3, which wrap partially around the pins 1 at two points which are substantially diametrically opposite one another. One of these segments is a bearing shell 6 which is affixed to at least one of the inner plates 3 and is freely rotatable on the pin 1, and which can be made in one or more parts, and rotates with the inner plates 3, while the other segment in each case is a clip 5 coupled with the pin in such a manner that, when the pin 1 rotates, it rotates with it. The bearing shells 6 are disposed each on the side of pin 1 that receives the tension of the chain, i.e., looking at the inner plates 3, they are on the outer sides of pin 1 facing the adjacent outer links 7, but the clips 5 are disposed on the pins' inner sides, as it can be seen especially in FIGS. 4 and 5. According to FIG. 2, the bearing shells 6 extend, for example, all the way into the pin holes 8 of the inner plates and are held in them in a form-locking manner. The clips 5 have, in accordance with FIG. 1 for example, radial projections or ribs 11 facing the pin 1; these are engaged in corresponding radial indentations or grooves 10 formed in the bearing areas 1a and running parallel to the pin axes, and thus they produce a form-fitting coupling between these two parts. At the same time the indentations or grooves 10 are each disposed on portions of the circumferential surfaces of the otherwise cylindrical pins 1 between the inner plates. Furthermore, the clips 5 consist of parts manufactured separately from the pins 1, which can be permanently joined to the pins 1 or also to the outer plates 7.

Figure 3:
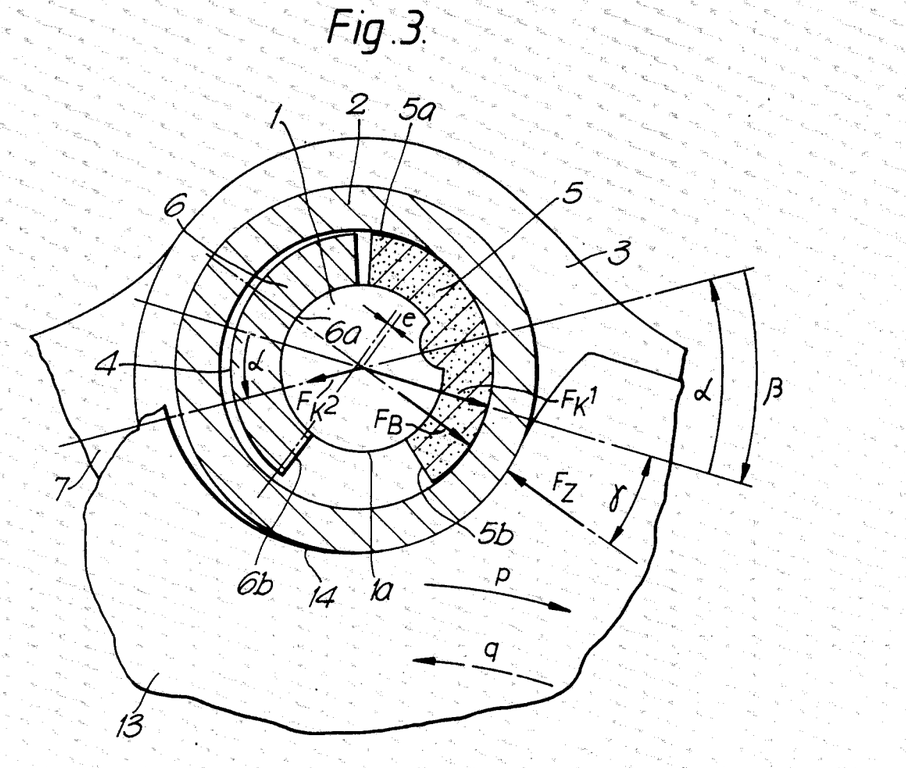
FIG. 3 is a enlarged view similar to FIG. 1, but only partially in cross section, of a pin bearing link which is engaged with a tooth of the sprocket.

According to FIG. 3, the clips 5 have on their outer sides facing away from the pins 1, a convex gripping surface 5a running along a cylindrical surface. The bearing shells 6 are each provided on their inner sides facing the pins 1 with a concave bearing face 6a running along a cylindrical surface, and on their outer sides facing the rollers 2 with a pin bearing gripping surface 4. The radii of the bearing faces 6a preferably are precisely equal to the radii of the circumferential surfaces 1a of the pins 1. Otherwise, the inner and outer circumferential surfaces of the clips 5 and bearing shells 6 are preferably defined by the lateral edges 5b and 6b, respectively, running preferably parallel to the pin axes.

Figure 1:
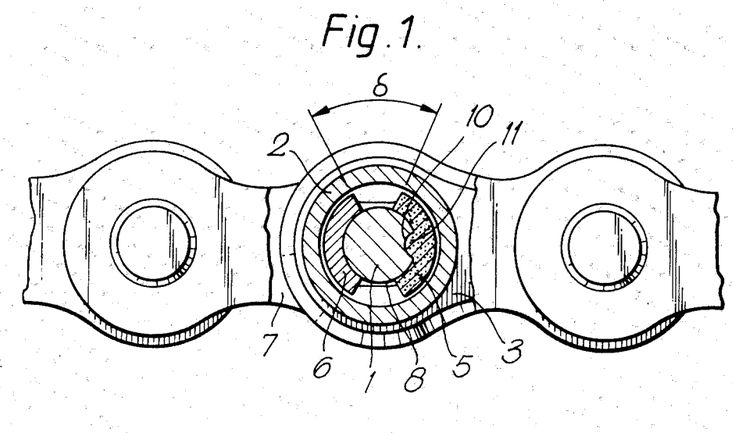
FIG. 1 is a cross section taken through a pin bearing link in the central plane of a roller chain according to the invention.
Figure 2:
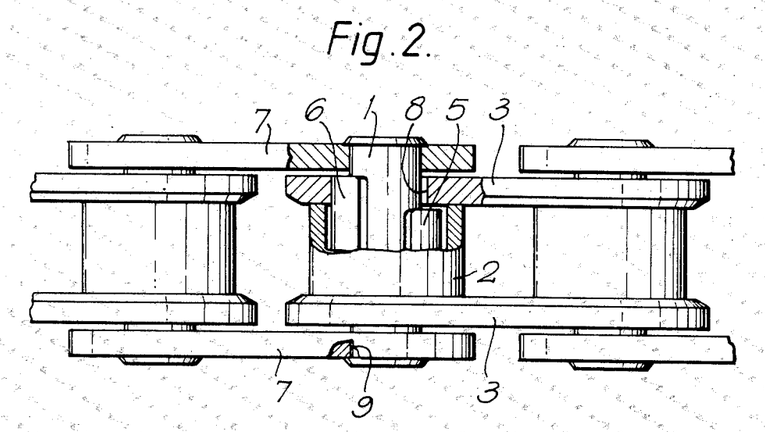
FIG. 2 is a plan view, partially in cross section, of the pin bearing link of FIG. 1.

The lengths of the clips 5 and pin bearings 6 around the circumference of the pins 1 are such that, between their confronting edges, when the roller chain is straight, a free space corresponding to an angle $\delta$ remains (FIG. 1). The magnitude of this angle $\delta$ determines the degree to which the inner plates can pivot about the pin axes when the roller chain runs onto a sprocket 13 (FIG. 3). The bearing shells 6 and clips 5 therefore clasp the pin on circumferential sections of less than 360°.

Lastly, each pair formed of bearing shell 6 and clip 5 is encompassed by a roller 2 disposed between the corresponding inner plates 3 and configured in the manner of a cylindrical ring, which is loosely rotatable with a certain clearance.

FIG. 3 shows a pin bearing link of a roller chain according to the invention whose roller 2 lies in a tooth gap of the sprocket 13. The arrow p indicates the situation in which the sprocket 13 is driven by the roller chain (chain pulled to the right in FIG. 3), while an arrow q indicates the situation in which the sprocket 13 is driving and consequently the chain runs leftward in FIG. 3. Therefore the inner link with the inner plates 3 represented in FIG. 3 is either at the beginning of a tilting movement by the angle $\alpha$ in order to swing out of the teeth of the sprocket 13 into the chain strand running in the direction of an arrow r (chain exit), or it is at the end of the in-swinging movement by the correspondingly large but opposite angle $\beta$, i.e., at the end of the in-swinging movement from the chain strand entering in the direction opposite that of the arrow r into the teeth of the sprocket 13 (chain entry). For the present consideration, the pin 1 is taken in the usual manner to be a stationary reference system about which the inner plates 3 rotate. In the center of the pin 1 the attacking chain forces are shown as $F_{k1}$ and $F_{K2}$. The resultant pin force $F_B$ and the tooth flank force $F_Z$ are indicated on the lower limb of the tooth flank angle y. The roller 2 in this situation is displaced by the amount e from the central axis of the link toward the tooth flank force $F_Z$ and is held in this position by the clip 5 and the tooth flank (through the pin force $F_B$ and tooth flank force $F_Z$). The bearing shell 6 can then turn on the pin 1 with the corresponding inner plates 3 of the inner link by the rotational angle α without contacting the roller 2. The clip 5 is fixed in its position by fastening on the pin 1 or on the outer plates 7 such that it must be stationary with the pin 1 and the corresponding outer plates 7, as seen from the sprocket 13. On the outer side of the bearing shell 6 there is the pin bearing gripping surface 4. It goes into operation in conjunction with the tilting motion of the outer plates 7 of the outer link; this will be explained further with the aid of FIG. 4.

Figure 4:
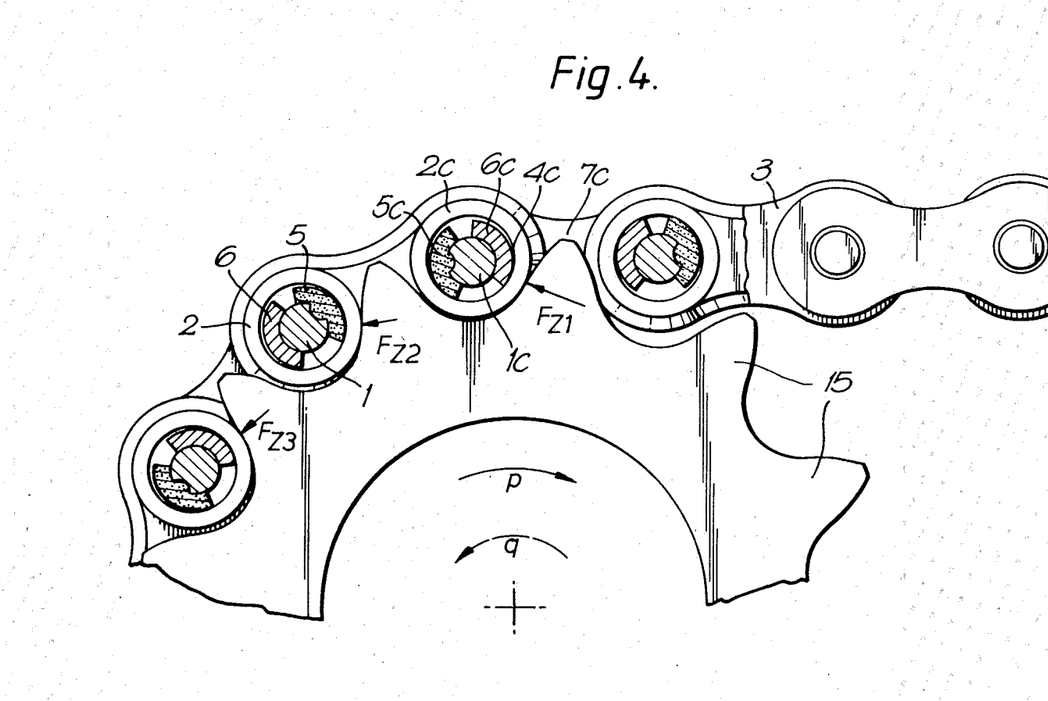
FIG. 4 is a side view similar to FIG. 3 of a number of inner and outer links disposed alternately in tandem, of a roller chain according to the invention which is in mesh with a sprocket.

FIG. 4 shows a plurality of pin bearing links of the chain in tandem and in engagement with teeth 15 of the sprocket 13. It can be seen that, in the area of the tooth engagement, the rollers 2 are held in their position by the pin bearing gripping surface 4 with the outer link leading, and by the clips 5 with the inner link 7 leading, in conjunction with the particular tooth flanks in each case, when the chain is drawn in the direction of the arrow p. But the reverse obtains when the sprocket is driving in the direction of the arrow q, since in this case the rollers 2 are held by the clips 5 with the outer link leading, and by the gripping surfaces 4 when the inner link is leading. The tooth flank forces $F_Z$ are shown in a simplified manner as decreasing as the chain passes further on around the sprocket. The exiting link (chain exit) and entering link (chain entry) here illustrated is an outer link with the outer plates 7c. In this operating situation, the pin 1c can rotate with the unstressed clip 5c within the bearing shell 6c as the outer link turns, without any contact between the clip 5c and the roller 2c, since the latter is engaged with the pin bearing gripping surface 4c.

From the descriptions given on FIGS. 1 to 4, it can be seen that the pin bearing link operates as follows:

In the area of tooth attack, the rollers 2 are held by means of the pin bearing gripping surfaces 4 or by means of the clips 5, as the case may be, (by the pin forces $F_B$ and tooth flank forces $F_Z$) excentrically from the pin center point to such an extent (dimension e) that the chain links tilting as they enter or exit can rotate freely on the rollers 2 without friction work, and the link friction is limited exclusively to the bearing faces 1a and 6a between the bearing shells 6 and the pins 1. At the same time the open design of the bearing shells 6 permits a complete and play-free engagement of the pin 1 in the bearing shells 6 if the radii of the bearing faces 1a and 6a are equal.

Figure 5:
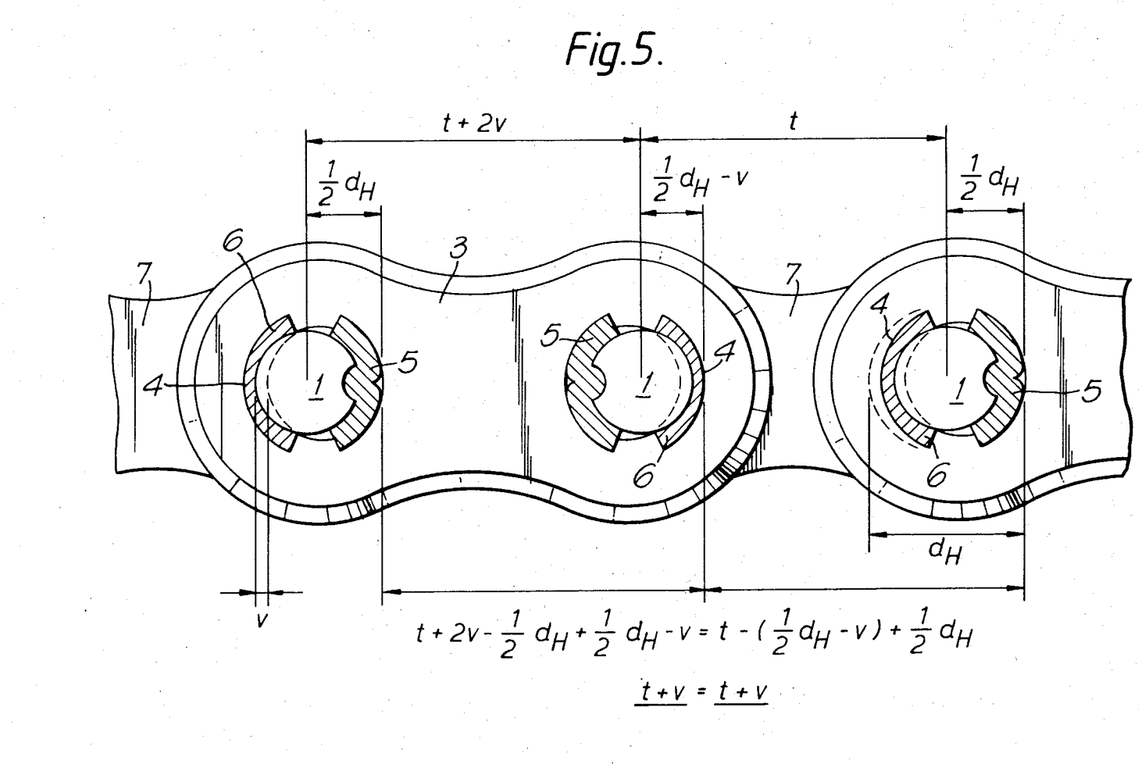
FIG. 5 is a diagrammatic side view similar to FIG. 3 of a plurality of chain links in linear arrangement after a preselected amount of wear v.

FIG. 5 shows the situation resulting for a chain pitch t in the case of link wear v. In the area of tooth contact, the rollers 2 are held by clips 5 and pin bearing gripping surfaces 4 alternately from tooth to tooth, according to FIG. 4. In a new chain without link wear, the distance of the pin center from the pin bearing gripping surface 4 or from the outer circumference of the clip 5 is uniformly $\frac{1}{2}d_H$, and the center-to-center separation of the pins or from roller to roller 2 is equal to the dimension t. FIG. 5 shows chain links with greatly worn bearing shells 6. The dimension between the pin centers of two pins affixed in the outer plates 7 still amounts to t. The dimension between the pin center and the pin bearing gripping surface 4 has decreased to $\frac{1}{2}d_H-v$ on account of the worn pins 1 or bearing shells 6. It follows that the distance between the centers of two pins 1 reaching through an inner plate 3 has increased to t+2v. Since the rollers 2 alternately engage the pin bearing gripping surfaces 4 and the clips 5, the lengthening of the pitch between the roller 2 therefore remains constant at t+v if pitch is taken here to mean the distance between the center points of the rollers 2 in the stressed state, i.e., with the chain running. Therefore, after a certain amount of wear, a uniform engagement between the chain and the sprockets is still assured.

The gripping surfaces 5a and the pin bearing gripping surfaces 4 of the bearing shells 6 are subject to virtually no wear, since they always rotate freely in the rollers 2.

The advantages achieved by the invention are essentially as follows:

The rollers 2 run free of friction as the links enter and leave the teeth of the sprockets. The link friction is concentrated exclusively at the bearing surfaces between the pins 1 and the bearing shells 6. The open design of the bearing shells 6 permits the pin 1 to nestle completely in the bearing shells 6. Thus low levels of link pressure are achieved. On account of the reduction of friction work and link pressure, in comparison with conventional roller chains, the amount of lubricant required and the lengthening of the chain due to wear are very slight. Since roller lubrication is eliminated, the chain runs over the sprockets on dry surfaces. The lengthening of the pitch due to wear is equal in the inner and outer links. This permits a perfect run in of the chain and sprocket corresponding to link wear. In chains for derailleurs, the great lateral flexibility of the chain links is advantageous. In conjunction with pins set flush in the outer surfaces of the outer links, the chain can be made extremely narrow. On account of the great lateral flexibility of the chain links, preselection through several transmission ratios is possible with the chain drive at rest, and even shifting through great differences in the number of sprocket teeth presents no problems. Lastly, there is a great advantage in the ease of producing the pins 1, clips 5 and bearing shells 6.

Figure 6:
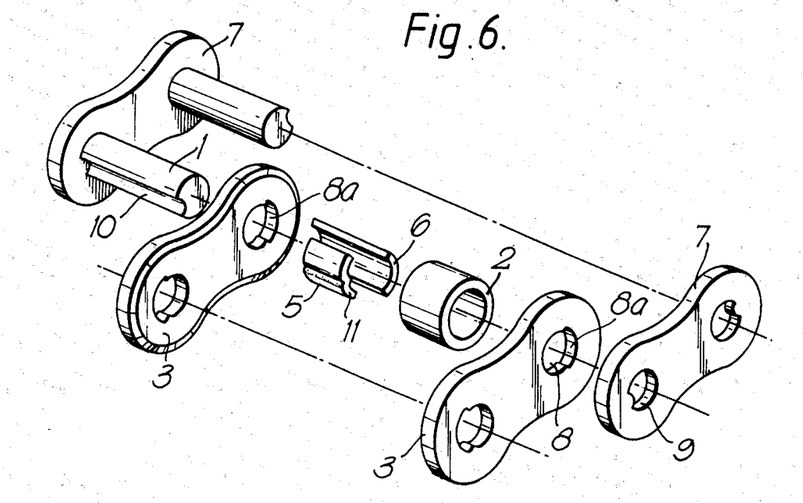
FIG. 6 is an exploded perspective view of a pin bearing link of a roller chain for derailleurs.
Figure 7:
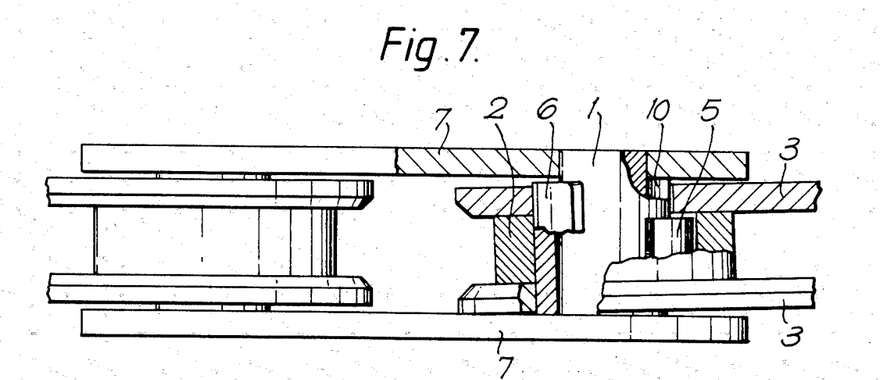
FIG. 7 is a plan view, partially in cross section, of the pin bearing link of FIG. 6.

FIGS. 6 and 7 show an embodiment of the roller chain according to the invention, in which lateral deflection of the links is necessary.

FIG. 6 is an exploded drawing showing the components of one pin bearing link. The one-piece bearing shell 6 connects the two inner plates 3, and is fixed in its position in segment-shaped expansions 8a of the otherwise cylindrical pin holes 8, which correspond to its circumferential angle. The groove 10 in the pin 1 accommodates the rib 11 of the clip 5 in a form-fitting manner so as to hold the pin in its position, and on the other hand it determines the position of the pin 1 in the outer plates 7 by virtue of the matching shape of the pin holes 9, which are provided with radially projecting lugs 9b engaging the grooves 10. The portions of the pin holes 8 in the inner plates 3 opposite the expansions 8a are made large enough so that the pin 1 will be able to perform pivoting movements on the rounded edges of the pin bearing 6 and thus the outer link with which it is associated will be able safely to perform relatively great lateral deflections. FIG. 7 shows the operating state in the case of maximum lateral deflection. In this case, on account of the full nestling, the pin 1 is in contact with the entire circumferential surface of the rounded edges of the pin bearing 6.

Figure 8:
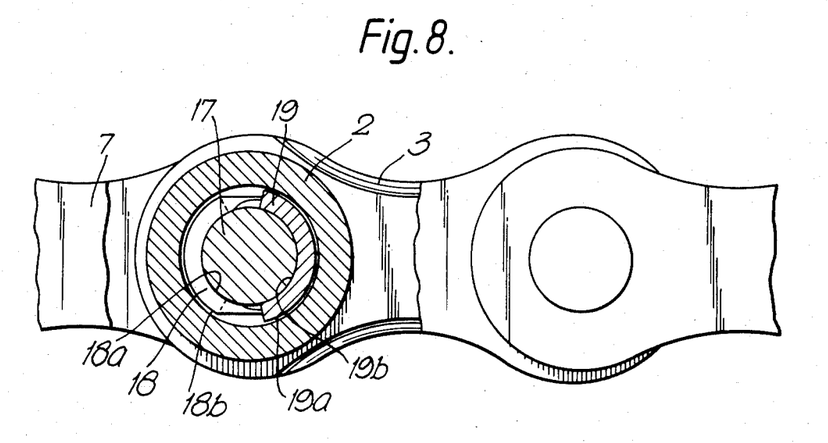
FIG. 8 is a cross section corresponding to FIG. 1 through another embodiment of the pin bearing link.
Figure 9:
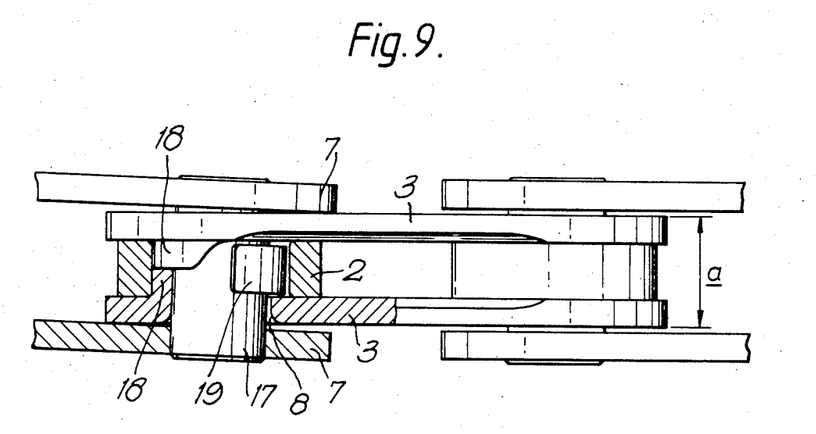
FIG. 9 is a view corresponding to FIG. 2 of the pin bearing link of FIG. 8.
Figure 10:
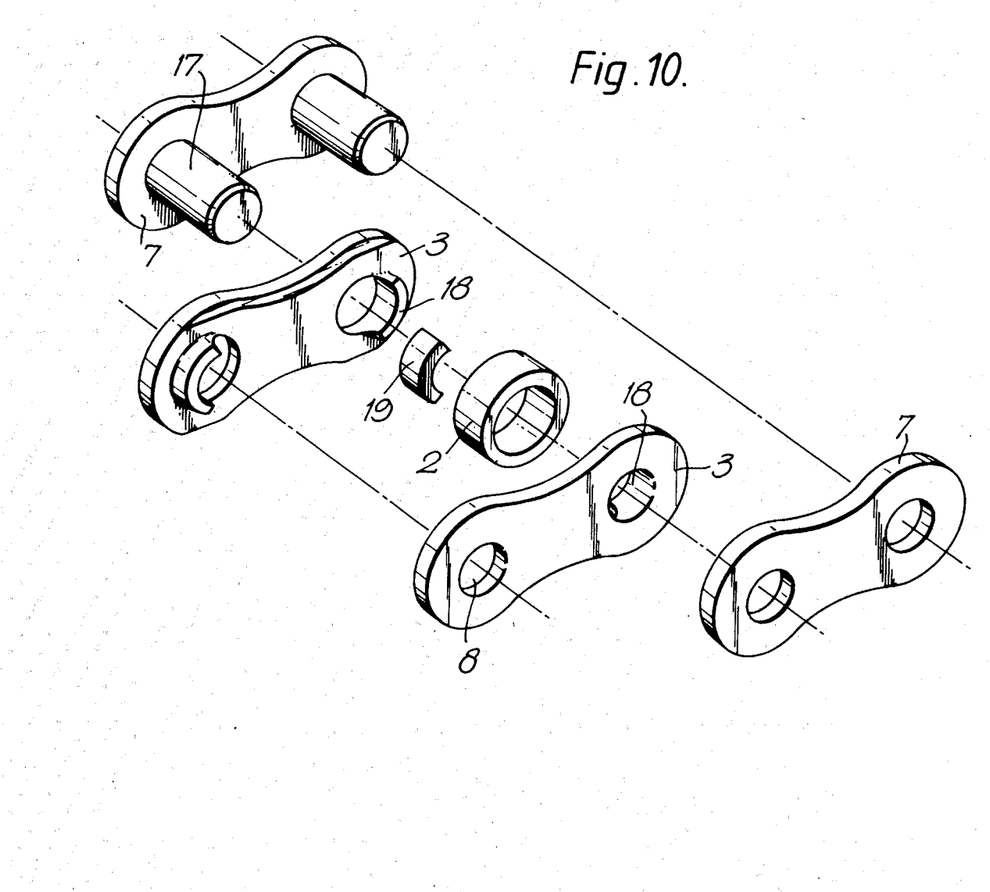
FIG. 10 is an exploded view of the preferred embodiment of the pin bearing link of FIGS. 8 and 9, FIGS. 11 and 12(a) to 12(h) represent diagrammatically the operation of the pin bearing link of FIGS. 8 to 10, FIGS. 13(a), 13(b) and 14(a), 14(b) are views corresponding to FIG. 9, of two additional embodiments of a clip of the roller chain according to the invention.

The roller chain described in conjunction with FIGS. 1 to 7 is especially suitable as a drive chain for motorcycles or bicycles without derailleurs. An especially preferred roller chain of the invention, suitable especially for use in racing and touring bicycles with derailleurs, is shown in FIGS. 8 to 10, in which equal parts are provided with the same reference numbers as in FIGS. 1 to 7. In comparison to roller chains in accordance with FIGS. 1 to 7 the following differences are provided.

The outer plates 7 are joined by pins 17 having fully cylindrical bearing surfaces 17a. The pin holes 8 of the inner plates 3, through which the pins 17 are passed, are also cylindrical, and have at their outer margins to which the chain force is applied a bearing shell 18 in the form of a collar, drawn out, for example, from the material of the inner plates 3, and consisting of a bearing-shell-like projection having a bearing surface 18a of cylindrical configuration, and an outer gripping surface 18b likewise of a cylindrical configuration. The circumferential angle of each bearing shell 18 amounts preferably to about 180 degrees. The axial length of each bearing shell 18 is such that the dimension a (FIG. 9) of each pair of inner plates 3, when the bearing shells 18 are in contact, is smaller than the dimension measured at the inner sides of the outer plates 7.

On the sides of pins 17 opposite the bearing shells 18, and between the two inner plates 3 of an inner link, a clip 19 is disposed, which has smooth arcuate lateral surfaces 20 and extends around the pin 17 over a circumferential angle of preferably about 140 degrees, so that it can turn freely by about 40 degrees around the pin 17 between the opposite edges of the bearing shells 18. Furthermore, each clip 19 has cylindrical gripping surfaces 19a and 19b facing the pin 17 and the roller 2, respectively. The bearing shells 18 and clips 19 otherwise are encompassed by the rollers 2 with a certain clearance, and establish the distance between the inner plates 3.

The pin holes 8 in the inner plates 3 are preferably of such a size that the outer link with the pin 17 can perform relatively great lateral movements as clearly shown in FIG. 9. The easy shifting of the roller chain is thus assured. Since the clip 19 is freely movable in the roller 2, the position of the clip 19 establishes itself always automatically in the constant alternation between the inward and outward turnings involved in common speed changes, such that no friction work can develop in roller 2 in those in-and-out movements which occur while the roller chain is under stress, as will be explained below in conjunction with FIGS. 11 and 12(a) to 12(h).

Figure 11:
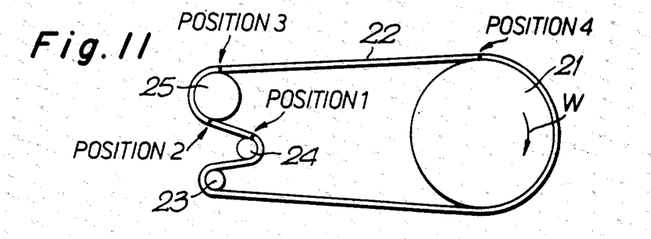
Figure 12A:
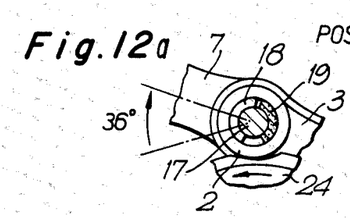
Figure 12B:
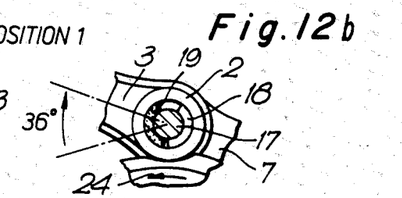
Figure 12C:
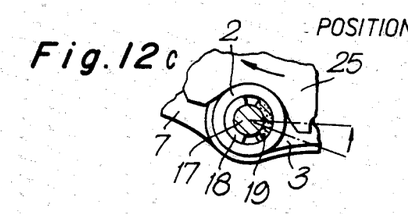
Figure 12D:
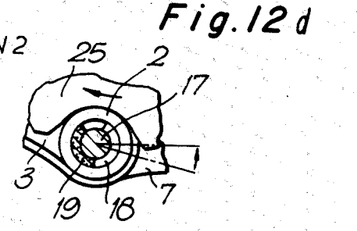
Figure 12E:
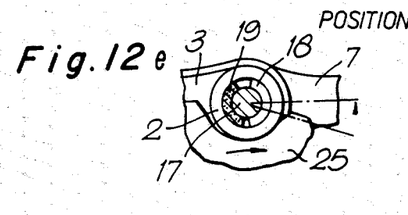
Figure 12F:
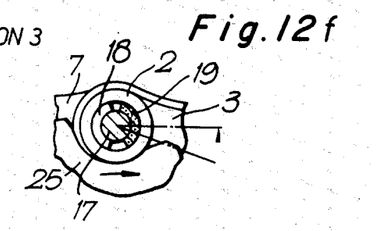
Figure 12G:
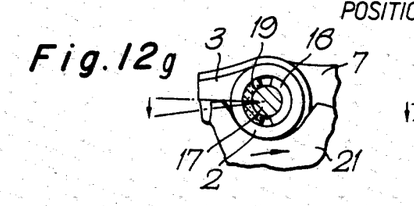
Figure 12H:
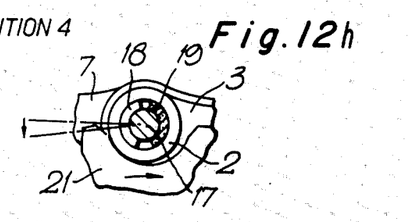

FIG. 11 shows a common chain drive for bicycles with derailleurs. In it, a sprocket 21 driven in the direction of an arrow w by a pedal crank that is not shown drives an endless roller chain 22 which runs over a tension pulley 23, a guide pulley 24 and a preselected driven sprocket of a set of sprockets fastened to a wheel, which is not shown. The guide pulley 24 is displaceable in the axial direction for the purpose of shifting the chain to another driven sprocket of the set of sprockets, and has, as a rule, ten flattened teeth, i.e., a pitch of 36 degrees, so that the chain links have to turn 36 degrees also on entering or leaving the driven sprocket.

FIGS. 12(a) to 12(h) show the interaction of the rocking movements at four points identified in FIG. 11 by pointers. FIGS. 12(a) to 12(h) show, on the left side, the situation of the leading outer plates 7, and on the right side the situation of leading inner plates 3. The light arrows identify the directions of rotation of the various sprockets and pulleys and the dark arrows identify the rocking angles. The pins 17 are divided by dark and light areas into four quadrants to indicate their rotatory positions. The points between point 4 and point 1, which are not shown, are unimportant because in this area the chain 22 is just normally tensed and transmits no driving forces.

When the chain runs off from the guide roller 24 (point 1), relatively small forces are acting on the links, namely on the one hand the tension forces acting in opposite directions and the bearing forces acting toward the center of the roller. When the outer plates 7 are running ahead (FIGS. 12(a), 12(c), 12(e) and 12(g)) a rotation of the pin 17 takes place. The position of the clip in this case is unimportant. Since the forces involved are slight no wear develops. When the inner plates 3 are leading, however (FIGS. 12(b), 12(d), 12(f) and 12(h)), the bearing shells 18 turn around the pin 17, so that the bottom gap between the bearing shells 18 and the clips 19 are nearly or entirely closed, depending on the previous position of the clips.

When the chain runs onto the driven sprocket 25 (point 2), the tension forces acting on the chain are applied to the tooth represented on the right at point 2, so that, when the outer plates 7 are leading, the clips 19 are gripped between the rollers 2 and the pins 17. Now, if the trailing inner plates 3 swing into the driven sprocket 25, the bearing shells 18 turn about the pin 1. If the clips 19 are in the right position they remain unaltered. If, however, they happen to assume an unfavorable position, they are turned by the abutting bearing shells 18. Since the acting forces are low, no wear is caused thereby. If the inner plates 3 are leading, their pins 1 turn when the outer plates 7 swing inward. Thus, on account of the slight clamping action, the clips 19 are driven along, so that the bottom gap at point 2 between the clips and the bearing shells 18 is fully closed if it was not already closed at point 1.

Upon leaving the driven sprocket 25 (point 3), the pins are again turned if the outer plates 7 are leading. Since in this area the greatest forces are transmitted by the chain to the driven sprocket 25 and its right-hand tooth, the bearing shells 18 are tightly gripped between the rollers 2 and the pins 1, while the clips 19 are free. Therefore, in spite of the transmission of force, no wear can occur between the rollers 2 and the clips 19. Yet the clips 19 can be slightly rotated by the pins 1. If the inner plates 3 are leading, the bearing shells 18 turn in the direction of the black arrows. Since the bottom gap at points 1 and 2 between the clips 19 and the bearing shells 18 have automatically closed, and furthermore it is not to be expected that there will be any change at this position between points 2 and 3, and at point 3 a rotation of the bearing shells in the opposite direction takes place, the bearing shells 18 can now turn freely, since on the one hand the clips 19 are tightly gripped between the rollers 2 and pins 1, but on the other hand the open gap between the clips and the bearing shells now at the bottom is greater than the turning angle, so that the bearing shells can not collide with the clips 19 during the turning movement. Thus no wear can occur at this point, either.

At point 4, the driving force is transmitted to the chain by the sprocket 21, so that the tooth on the left in FIGS. 12(a) to 12(h) becomes active. Therefore, when the outer plates 7 are leading, the clips 19 are gripped, while the bearing shells 18 rotate. Since this rotation, in relation to the pin rotation at point 3, is in the opposite direction, a sufficiently great free gap is again automatically available between the opposite edges of the clips and bearing shells to permit rocking without rotating the clips 19. In the most unfavorable case, but also the most improbable case on account of the conditions of operation, it might happen that between points 3 and 4 the clips 19 might be rocked upwardly from the position which they have assumed at point 3 such that the upper gap between the clips and the bearing shells 18 at position 4 is closed. In this case the clips 19 would be turned by the bearing shells 18 in spite of the gripping. Since the rocking angle at point 4, however, amounts to only about 6 to 10 degrees, even in this extremely unfavorable case the wear remains relatively slight. Lastly, when the inner plates 3 are leading, the momentary position of the clips at point 4, is unimportant since the pins 1 turn and the bearing shells 18 are gripped.

Thus it follows from FIGS. 12(a) to 12(h) that, in spite of the use of completely free clips 19, virtually no wear occurs on the chain, because due to the special conditions of operation in derailleurs accounding to FIG. 11, an automatic alignment of the clips 19 in the required position is always possible.

FIGS. 13(a) to 15 show roller chains with clips held by friction and positively. Equal parts are again provided with the same reference marks.

Figures 13A, 13B:
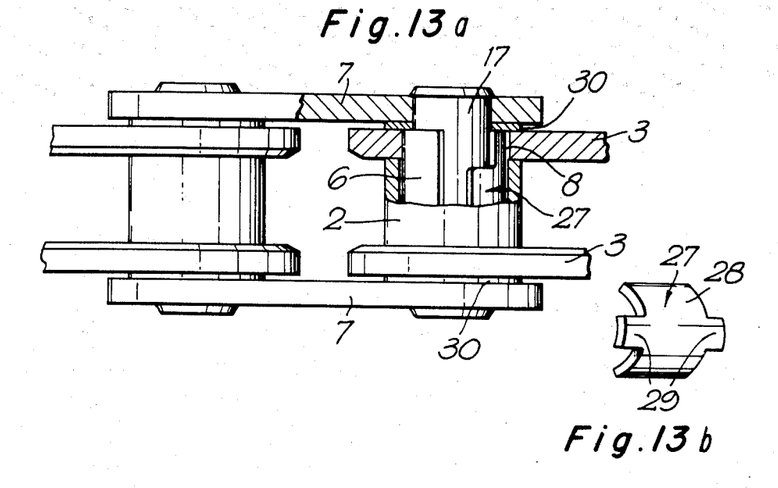
Figures 14A, 14B:
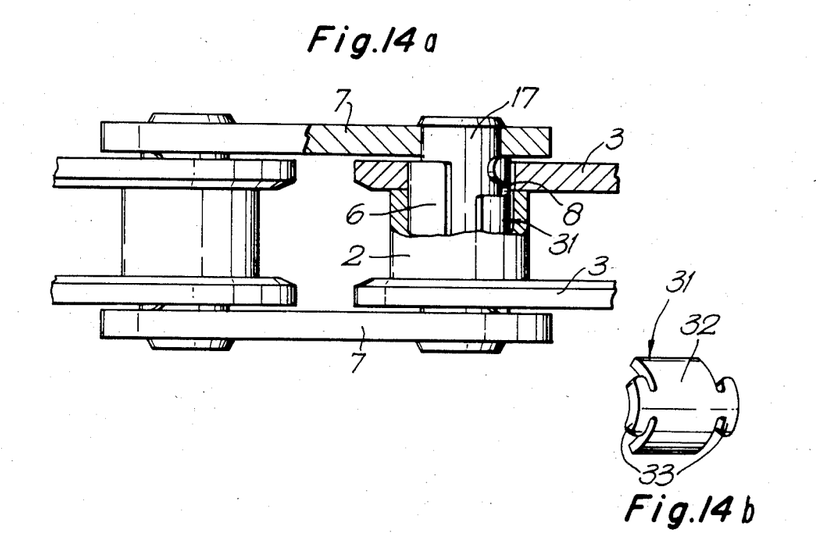

According to FIGS. 13(a) and 13(b), the bearing shells 6 are configured as in FIGS. 1 to 8. However, clips 27 are provided, which have a section 28 configured approximately like the clips 19, and are provided with two axially parallel prolongations 29. These prolongations 29 extend through expanded sections of the pin holes 8 of the inner plates 3 and rest upon friction rings 30 drawn onto the pins 17 between the outer and inner plates. According to FIGS. 14(a) and 14(b), clips 31 are provided which likewise have a section 32 corresponding to the clips 19, but are provided with resilient prolongations 33 which are supported against the inner sides of the outer plates 7. Therefore, the clips 27 are joined frictionally to the pins 17 and clips 31 are joined positively to the outer plates 7, so that they turn with them.

Figure 15:
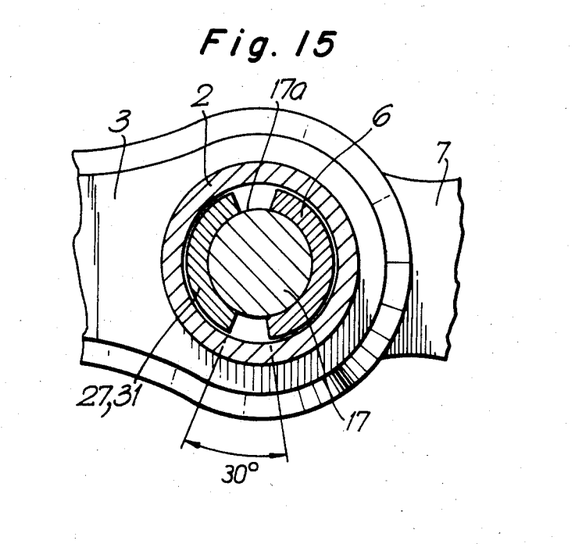
FIG. 15 is a view corresponding to FIG. 3 of the pin bearing links of FIGS. 12 and 13, and FIGS. 16(a) and 16(b) show two preferred forms of the pin holes in the inner plates of the pin bearing links.

FIG. 15 shows these chain links in a frontal cross section. It can be seen that the clips 27 and 31 can here turn 30 degrees in both directions with the outer links. This corresponds to the rocking angles upon entry into or exit from a twelve-tooth sprocket. As the chain links continue to turn against one another, the clips 27 and 31 are turned by the bearing shells 6 out of their position. After the clips have been turned over, however, they will always restore themselves to a center position due to the alternation of the entry and exit of the chain links, so that here again a basically friction-free running of the rollers 2 can be assured and the bearing friction is limited exclusively to the bearing surfaces between the bearing shells 6 and the pin 17. The friction rings 30 can simultaneously be designed as seals in order thus to obtain a largely maintenance-free chain link.

The roller chain with movable clips has all the advantages of the roller chains according to FIGS. 1 to 8. By eliminating the fastening of the clips 19, and 27 and 31, and by the frictional holding of same, the link components, such as pins and plates, can be of very simple design. The installation of the chain is easier to perform, since the position of the clips in the links is automatically adjusted during operation. The wrap-around angle of the bearing shells and clips can be larger, since the movement of the chain links is not limited by a fixed abutment of the bearing shell against the clip. This results in better link stress levels and greater tolerances for the manufacture of the parts. All in all, in comparison to the known roller chains, the roller chain with movable clips provides not only for unlimited chain link movement about the pin axis, but also for much greater simplicity in the manufacture and assembly of the components.

Figure 16A:
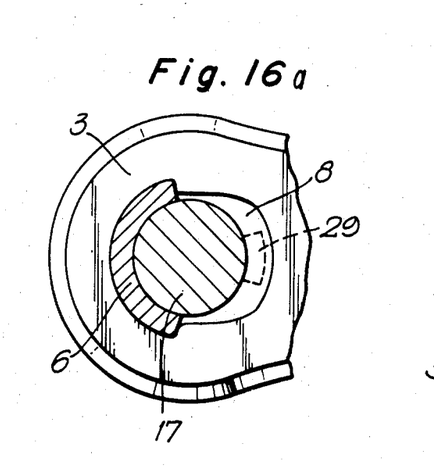
Figure 16B:
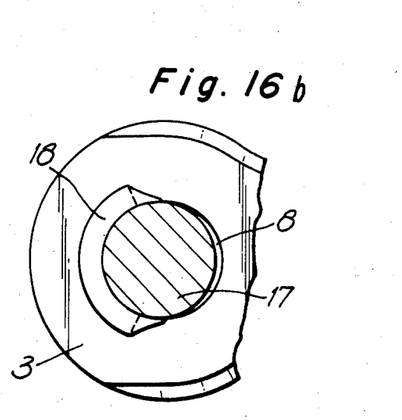

FIGS. 16(a) and 16(b) show two preferred embodiments of the pin holes 8 in the inner plates 3. In FIG. 16(a) it can be seen that the pin hole 8 is expanded in its right half in order to provide the prolongations 29 with sufficient space for the rocking and turning movements. In this special case, therefore, the pin hole 8 is not cylindrical, but is as shown in FIG. 6 in the area accommodating the bearing shell 6, and as a kind of elongated hole in the rest of the area. Similarly, a pin hole 8 is represented in FIG. 16(b), in an inner plate 3 in accordance with FIG. 10, wherein the left half, like bearing shell 18, has a radius corresponding to the pin radius, while the right half has a larger radius and a center offset slightly to the right, the two corresponding circles running together tangentially. Both of the embodiments represented in FIG. 16 are especially suitable for chains in which lateral deflections are necessary or desired.

The roller chain according to this invention and the parts thereof may be fabricated by common methods and from common materials. The materials are, for example, heat treated or quenched steel or sheet, or sheet steel. The surfaces of the link parts may be protected against wear by means of a coating of carbon or carbon/metal.

I claim:

1. Roller chain for chain drives having a plurality of inner and outer links disposed alternately in tandem, the inner links having at least two inner plates with two pairs of coaxially aligned pin holes and with pin bearings disposed between the latter, the outer links containing at least two outer plates each which are joined together by at least two pins fastened to them, while for the articulated joining of the outer links to each of the two adjacent inner links the pins of each outer link extends through one of the pairs of pin holes and the associated pin bearing of one of the adjacent inner links and the other pin of each outer link extends through one of the pair of pin holes and the associated pin bearing of the other of the adjacent inner links, and the pin bearings are surrounded by rollers disposed for loose rotation between the inner plates, characterized by the fact that the pin bearings consist of bearing shells which are joined fixedly to the inner plates and only partially encompass the pins which, with the roller chain in the outstretched position, are disposed each on the sides of the pins which face the adjacent outer links, and are situated opposite clips which are disposed within the rollers and between the inner plates and only partially encompass the pins, and only partially encompass the pins, these clips, together with the bearing shells, extending around a portion of the circumference of the pins totalling less than 360, so that the clips are movable circumferentially relative to the bearing shells, said clips and said pins being provided with mating projections.

2. Roller chain for chain drives, comprising:
a plurality of inner links, each inner link having at least two inner plates, said inner plates having facing inner surfaces and coaxially aligned pin holes at opposite ends;
a plurality of outer links, each outer link having at least two outer plates, said outer plates having facing inner surfaces and being joined together at opposite ends thereof by pins which are fastened to them and substantially have a circular cross section, said outer and inner links being disposed alternatively in tandem and being articulatedly joined to each other such that the pin joining one of the ends of the outer plates of any outer link projects through the pin holes at associated ends of the inner plates of a first adjacent inner link and that the pin joining the other ends of the outer plates of the same link projects through the pin holes of associated ends of the inner plates of a second adjacent inner link;

a plurality of pin bearings, each pin bearing being provided for a corresponding one of said pins and having a bearing shell and a clip, said bearing shell being coupled to at least one of the inner plates adjacent to said corresponding one of said pins for rotation with said one inner plate, and said bearing shell further only partially encompassing the corresponding pin and being disposed on the corresponding pin adjacent to the outer link, and said clip only partially encompassing said corresponding pin on a side of the corresponding pin diametrically opposite to the bearing shell, said bearing shell and said clip encompassing the corresponding pin around a portion of the circumference thereof totalling less than 360° such that the bearing shell and the clip are movable circumferentially to each other, and said bearing shell and said clip being only disposed in a space between the inner surfaces of the outer plates; and a plurality of rollers, each roller surrounding an associated one of said pin bearings for loose rotation thereon and being disposed between the inner surfaces of the inner plates.

3. The roller chain according to claim 2, wherein said clip is coupled to said corresponding pin by a form fit.

4. The roller chain according to claim 3, wherein said clip has a projection and wherein said corresponding pin has a groove for receiving said projection.

5. The roller chain according to claim 2, wherein said clip is coupled by the application of force to the outer plates.

6. The roller chain according to claim 5, wherein the pin holes have expanded sections and wherein said clip has resilient prolongations resting against the inner surfaces of the outer plates.

7. The roller chain according to claim 5, wherein said pin holes have expanded portions, and further including friction rings on said corresponding pin and disposed between the inner and outer plates, said clip being provided with prolongations resting against said friction rings.

8. The roller chain according to claim 2, wherein the bearing shell encompasses said corresponding pin over a first circumferential portion of about 180° and wherein said clip encompasses said corresponding pin over a second circumferential portion of about 140°.

9. The roller chain according to claim 2, wherein the bearing shell is formed by two facing collars, each collar being integrally formed at the pin holes and projecting from the inner surface of the inner plates.

10. The roller chain according to claim 2, wherein the bearing shell is a one-piece shell having opposite ends, wherein the pin holes of the inner plates are provided with expansions and wherein each end of the shell is fixed in its position in one of said extensions.

11. The roller chain according to claim 2, wherein said clip is freely movably disposed between said associated one of said pins and said roller.

12. A roller chain for chain drives, comprising:
a plurality of inner links, each inner link having at least two inner plates, said inner plates having facing surfaces and coaxially aligned pin holes at opposite ends;

a plurality of outer links, each outer link having at least two outer plates, said outer plates having facing inner surfaces and being joined together at opposite ends thereof by pins which are fastened to them and substantially have a circular cross section, said outer and inner links being disposed alternately in tandem and being articulatedly joined to each other such that the pin joining one of the ends of the outer plates of any outer link projects through the pin holes at associated ends of the inner plates of a first adjacent inner link and that the pin joining the other ends of the outer plates of the same outer link projects through the pin holes of associated ends of the inner plates of a second adjacent inner link;

a plurality of pin bearings, each pin bearing being provided for a corresponding one of said pins and having a bearing shell and a clip, said bearing shell being coupled to at least one of the inner plates adjacent to said corresponding pin for rotation with said one inner plate, and said bearing shell further only partially encompassing said corresponding pin and being disposed at a location adjacent to said outer link, and said clip only partially encompassing said corresponding pin at a position on said corresponding pin which is diametrically opposite to said bearing shell, said bearing shell and said clip encompassing said corresponding pin around a portion of the circumference of said corresponding pin totalling less than 360° such that the bearing shell and the clip are movable circumferentially relative to each other, said clip and said corresponding pin having means for attaching said clip to said corresponding pin in a manner such that said clip can rotate with said corresponding pin under normal circumstances and can slide on said corresponding pin and move relative thereto in other circumstances, and said bearing shell and said clip being only disposed in a space between the inner surfaces of the outer plates; and a plurality of rollers, each roller surrounding an associated one of said pin bearings for loose rotation thereon and being disposed between the inner surfaces of the inner plates.

13. The roller chain according to claim 12, wherein the means for attaching said clip to said corresponding pin includes a projection on said clip and a groove defined in said corresponding pin for receiving said clip projection.

* * * * *